US011110527B2

United States Patent
Kumoi et al.

(10) Patent No.: US 11,110,527 B2
(45) Date of Patent: Sep. 7, 2021

(54) CUTTING INSERT AND CUTTING TOOL

(71) Applicant: TUNGALOY CORPORATION, Fukushima (JP)

(72) Inventors: Haruki Kumoi, Iwaki (JP); Ryuichi Saji, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 205 days.

(21) Appl. No.: 16/517,709

(22) Filed: Jul. 22, 2019

(65) Prior Publication Data

US 2020/0086403 A1 Mar. 19, 2020

(30) Foreign Application Priority Data

Sep. 14, 2018 (JP) .............................. JP2018-172324

(51) Int. Cl.
*B23C 5/22* (2006.01)
*B23C 5/06* (2006.01)

(52) U.S. Cl.
CPC .............. *B23C 5/2213* (2013.01); *B23C 5/06* (2013.01); *B23C 2200/0422* (2013.01); *B23C 2210/16* (2013.01)

(58) Field of Classification Search
CPC ......... B23C 5/2213; B23C 5/06; B23C 5/202; B23C 2210/16; B23C 2210/163; B23C 2210/168; B23C 2210/207; B23C 2200/0422
See application file for complete search history.

(56) References Cited

U.S. PATENT DOCUMENTS

| | | | | |
|---|---|---|---|---|
| 3,831,237 A | * | 8/1974 | Gunsalus | B23C 5/207 407/41 |
| 6,053,671 A | * | 4/2000 | Stedt | B23C 5/2221 407/35 |
| 6,168,356 B1 | * | 1/2001 | Sjoo | B23B 27/065 407/104 |
| 6,607,335 B2 | * | 8/2003 | Morgulis | B23C 5/226 407/40 |
| 7,121,771 B2 | * | 10/2006 | Englund | B23B 27/1622 407/103 |
| 7,637,701 B2 | * | 12/2009 | Pantzar | B23C 5/2213 407/113 |
| 7,802,944 B2 | * | 9/2010 | Engstrom | B23C 5/2247 407/66 |
| 9,120,154 B2 | * | 9/2015 | Hecht | B23B 29/06 |
| 9,120,156 B2 | * | 9/2015 | Hecht | B23B 27/1677 |
| 2002/0028116 A1 | | 3/2002 | Morgulis | |

(Continued)

FOREIGN PATENT DOCUMENTS

| CN | 1404425 A | 3/2003 |
|---|---|---|
| CN | 104364037 A | 2/2015 |

(Continued)

*Primary Examiner* — Nicole N Ramos
(74) *Attorney, Agent, or Firm* — Studebaker & Brackett PC

(57) ABSTRACT

A cutting insert 10 comprises a peripheral side surface 16 comprising a plurality of peripheral side surface parts 16A-16H formed so as to be in rotational symmetry with respect to a central axis AX. In the cutting insert 10, a second end surface 14 is provided with a plurality of inclined surface parts 13A-13H formed so as to be in rotational symmetry with respect to the central axis AX and to be recessed from a peripheral edge part 14A.

10 Claims, 11 Drawing Sheets

(56) References Cited

U.S. PATENT DOCUMENTS

| | | | |
|---|---|---|---|
| 2003/0143044 A1 | 7/2003 | Rothenstein | |
| 2007/0122242 A1* | 5/2007 | Englund | B23B 27/1622 |
| | | | 407/103 |
| 2007/0160431 A1 | 7/2007 | Pantzar | |
| 2007/0245535 A1* | 10/2007 | Noggle | B23C 5/2243 |
| | | | 29/428 |
| 2008/0181731 A1* | 7/2008 | Wallstrom | B23C 5/2213 |
| | | | 407/116 |
| 2015/0174664 A1 | 6/2015 | Nam et al. | |
| 2017/0320145 A1 | 11/2017 | Peiiersson et al. | |

FOREIGN PATENT DOCUMENTS

| | | |
|---|---|---|
| CN | 104588704 A | 5/2015 |
| JP | H08-071833 A | 3/1996 |
| JP | H09-290316 A | 11/1997 |
| JP | 2002-542952 A | 12/2002 |
| JP | 2003-275920 A | 9/2003 |
| JP | 2007-021622 A | 2/2007 |
| JP | 2007-152552 A | 6/2007 |
| JP | 2009-172761 A | 8/2009 |
| JP | 2017-536253 A | 12/2017 |
| TW | 505551 B | 10/2002 |
| WO | 00/66305 A1 | 11/2000 |
| WO | 2005/118192 A1 | 12/2005 |

* cited by examiner

CUTTING INSERT AND CUTTING TOOL

TECHNICAL FIELD

The present invention relates to a cutting insert and a cutting tool.

BACKGROUND ART

An indexable cutting tool which performs cutting with the use of a plurality of cutting inserts involves various methods of fixing cutting inserts to a holder for holding such cutting inserts. A known example thereof is a fixation method involving pressing cutting inserts against a holder with the use of wedge members or clamps.

However, a fixation method involving the use of wedge members or clamps requires a long time for cutting insert replacement. In particular, if a large number of cutting inserts are to be held or if small-diameter screws have to be used due to a reduction in the size of cutting inserts and this makes it difficult to handle such cutting inserts, the time required for replacement greatly influences the working efficiency. There is another problem in that, when a cutting insert is provided with a through hole which penetrates such cutting insert in order to fix the cutting insert, the stability of the shape is degraded.

SUMMARY

Technical Problem

JP2017-536253 T discloses a cutting tool which solves the above-described problems, and which accordingly allows for simple mounting of a cutting insert at a precise position. More specifically, JP2017-536253 T discloses a fixation method in which: an end surface of a cutting insert is provided with a first locking member (211a) whereas an insert seat of a holder is provided with a second locking member (108) configured to be engaged with the first locking member; and the cutting insert is pressed against the holder by means of a fixture.

However, as shown in FIG. 10 of JP2017-536253 T, in the cutting tool described in JP2017-536253 T, a bottom surface part of a holder is provided with an elongated locking convex part 108 formed in a linear shape, and a cutting insert is provided with an elongated locking groove 211 which is engaged with the locking convex part 108. Thus, in order to replace a cutting edge to be used for cutting, it is necessary to perform the following complicated work including: loosening a fixture; moving the cutting insert along the locking groove 211 and thereby completely separating the cutting insert from the holder; and then remounting the cutting insert on the holder in order to perform cutting with a different cutting edge of the cutting insert.

An object of the present invention is to provide a cutting insert and a cutting tool which allow for the replacement of a cutting edge to be used for cutting even if the cutting insert is not completely separated from a holder and which allows the cutting insert to be stably fixed to the holder.

Solution to Problem

A cutting insert according to an aspect of the present disclosure comprises: a first end surface; a second end surface facing an opposite direction with respect to the first end surface; a peripheral side surface connecting the first end surface and the second end surface and provided with a plurality of peripheral side surface parts formed so as to be in rotational symmetry with respect to a central axis which penetrates the first end surface and the second end surface; and a plurality of cutting edges respectively formed in connecting parts between the plurality of peripheral side surface parts and the first end surface. The second end surface comprises a plurality of inclined surface parts which each have a normal intersecting with the central axis and which are formed so as to be in rotational symmetry with respect to the central axis.

It is preferable that: each of the plurality of peripheral side surface parts comprises a surface whose normal passes through the central axis; and, in an end view seen from a direction facing the second end surface, the normal connecting each of the plurality of inclined surface parts and the central axis and the normal connecting each of the plurality of peripheral side surface parts and the central axis are shifted from one another so as to form an obtuse angle or an acute angle.

The second end surface may comprise a peripheral edge part surrounding the inclined surface parts. The peripheral edge part encompasses a peripheral edge portion connected to the peripheral side surface but is not limited to such peripheral edge portion. Further, such peripheral edge part constitutes a surface serving as a reference surface which defines a recess of an inclined surface. The peripheral edge part preferably configures a flat surface or is flat; however, such peripheral edge part is not limited thereto.

A holder according to another aspect of the present disclosure holds a plurality of cutting inserts. The holder comprises a plurality of insert pockets for respectively holding the plurality of cutting inserts; each of the plurality of insert pockets comprises a first wall part for coming into contact with one of the plurality of peripheral side surface parts of the cutting insert to be held, a second wall part for coming into contact with another one of the plurality of peripheral side surface parts, a ceiling part for coming into contact with the first end surface, and a bottom part for coming into contact with the second end surface; and the holder is provided with a plurality of through holes each of which is provided, so as to be opened in the bottom part, with a female thread for screwing with a pin for pressing the inclined surface part of the cutting insert held in the insert pocket, said pressing to be made in a direction of the first end surface, wherein the plurality of through holes corresponds to the plurality of insert pockets.

A cutting tool according to another aspect of the present disclosure comprises the above-described holder and a plurality of cutting inserts held by the holder. Such cutting tool is preferably a rotating tool such as a milling cutter.

A cutting insert according to an aspect of the present disclosure comprises: a first end surface; a second end surface facing an opposite direction with respect to the first end surface; a peripheral side surface connecting the first end surface and the second end surface and provided with a plurality of peripheral side surface parts formed so as to be in rotational symmetry with respect to a central axis which penetrates the first end surface and the second end surface; and a plurality of cutting edges respectively formed in connecting parts between the plurality of peripheral side surface parts and the first end surface. The second end surface is provided with a plurality of inclined surface parts which each have a normal which intersects, above the second end surface, with the central axis, wherein such inclined surface parts are in rotational symmetry with respect to the central axis. At this time, when the second end surface is seen from a direction of the central axis, it is preferable for the normals of the inclined surface parts and normals of the peripheral side surface parts not to match each other. Further, a cutting insert according to an aspect of the present disclosure comprises: a first end surface which forms a regular polygonal shape in a plan view; a second end surface facing an opposite direction with respect to the first end surface; a peripheral side surface connecting the first end surface and the second end surface and provided with a plurality of peripheral side surface parts formed so as to be in rotational symmetry with respect to a central axis which penetrates the first end surface and the second end surface; and a plurality of cutting edges respectively formed in connecting parts between the plurality of peripheral side surface parts and the first end surface. The second end surface is provided with a recess comprising a plurality of inclined surface parts which each have a normal intersecting with the central axis and which are formed so as to be in rotational symmetry with respect to the central axis, the inclined surface parts being equal in number to the peripheral side surface parts. Further, in an end view seen from a direction facing the second end surface, with regard to at least one of the inclined surface parts, an angle formed by the normal of each of the inclined surface parts which passes through the central axis and a normal of the peripheral side surface part through which the said normal passes, wherein such normal passes through the central axis, is different from an angle formed by the normal of the said inclined surface part and a normal of the peripheral side surface part adjacent to the said peripheral side surface part, wherein such normal passes through the central axis.

DESCRIPTION OF EMBODIMENTS

Embodiments of the present invention will hereinafter be described with reference to the drawings. The embodiments below are illustrative in order to describe the present invention and are not intended to limit the present invention to such embodiments.

Figure 1:
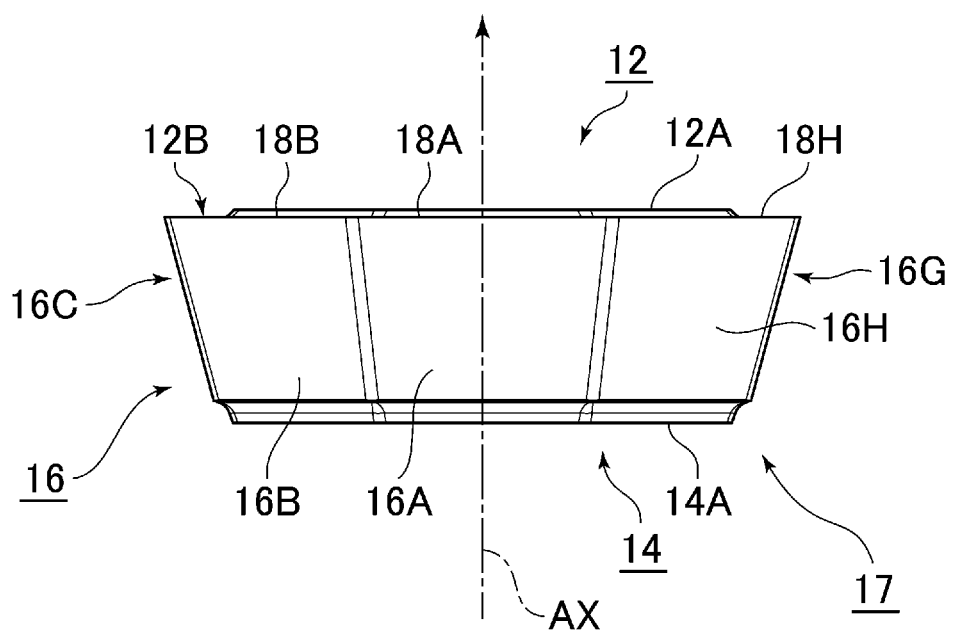
FIG. 1 is a front view of a cutting insert 10.
Figure 2:
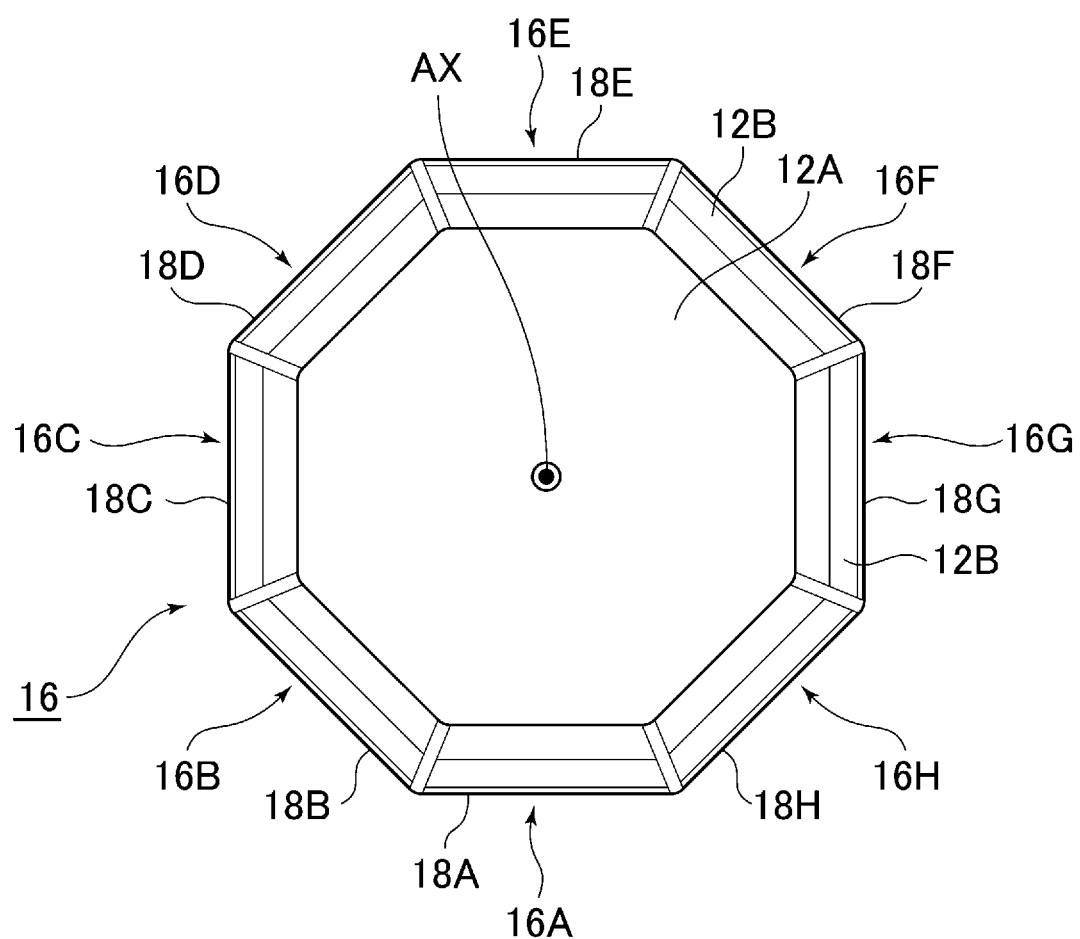
FIG. 2 is a plan view of the cutting insert 10.
Figure 3:
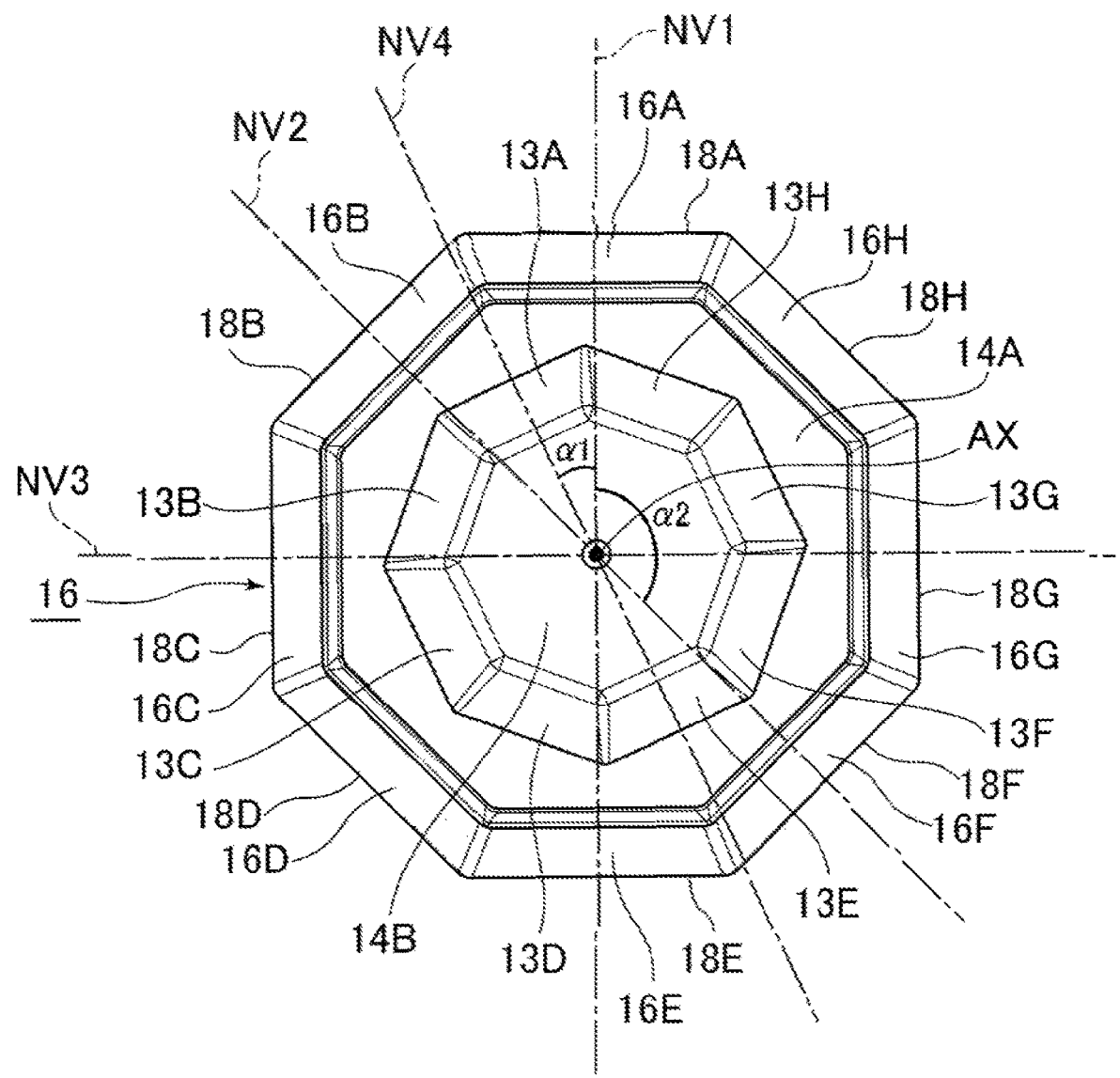
FIG. 3 is a bottom view of the cutting insert 10.

FIG. 1 is a front view of a cutting insert 10 according to the present embodiment. FIG. 2 is a plan view in which the cutting insert 10 is seen from a direction facing a first end surface 12. FIG. 3 is a bottom view in which the cutting insert 10 is seen from a direction facing a second end surface 14.

As shown in these figures, the cutting insert 10 includes the first end surface 12, the second end surface 14 facing an opposite direction with respect to the first end surface 12, and a peripheral side surface 16 connecting the first end surface 12 and the second end surface 14.

The peripheral side surface 16 comprises eight peripheral side surface parts 16A-16H, which are provided so as to be in 45-degree rotational symmetry with respect to a central axis AX, which penetrates a center of the first end surface 12 and a center of the second end surface 14. Each of the peripheral side surface parts 16A-16H consists of a flat surface, and is, as shown in FIG. 1, inclined so as to form an acute angle of approximately 60 to 80 degrees with respect to a first major surface 12A and to form an obtuse angle of 100 to 120 degrees with respect to a peripheral edge part 14A or a bottom surface part 14B of the second end surface 14. The peripheral side surface parts 16A-16H, which are provided adjacent to one another, are connected with one another via smoothly curved surfaces. Further, each of the peripheral side surface parts 16A-16H has a normal which passes through the central axis AX. FIG. 3 shows, in an end view: a normal NV1, of the peripheral side surface part 16A, which passes through the central axis AX; a normal NV2, of the peripheral side surface part 16B, which passes through the central axis AX; and a normal NV3, of the peripheral side surface part 16C, which passes through the central axis AX. Since the cutting insert 10 according to the present embodiment includes the eight peripheral side surface parts 16A-16H, which are formed so as to be in rotational symmetry with respect to the central axis AX, the normal NV1 and the normal NV2 form an angle of 45 degrees and the normal NV2 and the normal NV3 form an angle of 45 degrees in the end view.

The first end surface 12 comprises a peripheral edge part 12B connected with the peripheral side surface 16 and the first major surface 12A surrounded by the peripheral edge part 12B. As shown in FIG. 1, the first major surface 12A consists of a flat surface which protrudes slightly outward from the peripheral edge part 12B and which is perpendicular to the central axis AX. Further, as shown in FIG. 2, in an end view in which the first end surface 12 is seen from a direction of the central axis AX, a contour of the first major surface 12A forms an octagon similar to an octagon matching a contour of a connecting part connecting the peripheral side surface 16 and the first end surface 12.

A cutting edge is formed in a connecting part between the peripheral edge part 12B and the peripheral side surface 16. More specifically, linear cutting edges 18A-18H, which respectively configure lines or form linear shapes, are formed in respective connecting parts between the peripheral side surface parts 16A-16H and the peripheral edge part 12B. Further, circular-arc-shaped corner cutting edges, which connect the linearly-shaped adjacent cutting edges 18A-18H, are formed in respective connecting parts between the curved surfaces, which connect the peripheral side surface parts 16A-16H, and the peripheral edge part 12B. It should be noted that, for example, a land for preventing a cutting edge from fracturing may further be provided in the connecting part between the peripheral edge part 12B and the peripheral side surface 16.

As shown in FIG. 3, the second end surface 14 includes: the peripheral edge part 14A connected with the peripheral side surface 16; and a center part surrounded by the peripheral edge part 14A and formed so as to be recessed with respect to the peripheral edge part 14A. The center part comprises inclined surface parts 13A-13H and the bottom surface part 14B surrounded by the inclined surface parts 13A-13H. Each of the inclined surface parts 13A-13H includes a connecting part connected with the peripheral edge part 14A and is formed so as to be recessed such that a distance thereof from the central axis AX becomes shorter as it heads away from such connecting part and to be inclined with respect to the central axis AX. Each of the inclined surface parts 13A-13H comprises, as its major surface, a convex surface having a curvature low enough to be convex toward the central axis AX. However, the major surface of each of the inclined surface parts 13A-13H may be configured by a flat surface rather than a curved surface. Further, the concave surface configuring the major surface of each of the inclined surface parts 13A-13H has a normal which passes through the central axis AX in the end view. FIG. 3 shows a normal NV4 of the inclined surface part 13A which passes through the central axis AX. The inclined surface parts 13A-13H are provided so as to be in 45-degree rotational symmetry with respect to the central axis AX, and the inclined surface parts 13A-13H, which are provided adjacent to one another, are indirectly connected to one another. However, the inclined surface parts 13A-13H, which are provided adjacent to one another, may be directly connected to one another via curved surfaces, etc. Each of the inclined surface parts 13A-13H is connected, at its side closest to the central axis AX, with the bottom surface part 14B. A contour obtained by connecting respective connecting parts between the inclined surface parts 13A-13H and the peripheral edge part 14A forms an octagon, putting aside the point that the apexes are round when seen from the end view. Further, a contour obtained by connecting respective connecting parts between the inclined surface parts 13A-13H and the bottom surface part 14B similarly forms an octagon when seen from the end view. The bottom surface part 14B includes, as its major surface, a flat surface perpendicular to the central axis AX. However, as shown in FIG. 3, the respective lines obtained by connecting the central axis AX and the apexes of the octagon, wherein such octagon is formed by connecting the linear cutting edges 18A-18H, do not match the respective lines obtained by connecting the central axis AX and the apexes of the octagon, wherein such octagon matches the contour obtained by connecting the respective connecting parts between the inclined surface parts 13A-13H and the peripheral edge part 14A, and the former respective lines are shifted from the latter respective lines so as to form acute angles (such as angle α1) or obtuse angles (such as angle α2) when seen from the end view (when, due to the peripheral side surface 16, etc. having curved surfaces, the contour is hidden and cannot be seen from the second end surface side, a projection line obtained by projecting such contour onto a plane perpendicular to the central axis AX is regarded as the contour line).

Herein, in the end view, an angle α1 formed by the normal NV4 of the inclined surface part 13A which passes through the central axis AX, and the normal NV1 of the peripheral side surface part 16A which passes through the central axis AX, is 25 degrees. Further, in the end view, an angle formed by the normal NV4 of the inclined surface part 13A which passes through the central axis AX, and the normal NV2 of the peripheral side surface part 16B which passes through the central axis AX, is 20 degrees. Therefore, the normal NV4 is shifted from each of the normals NV1 and NV2, and the normal NV4 is not a bisector between the normals NV1 and NV2 and is closer to the normal NV2.

Since the above-described cutting insert 10 comprises the inclined surface parts 13A-13H, the cutting insert 10 can be restrained both in a direction of the first end surface 12 and in a direction of the peripheral side surface 16. Further, since the cutting insert 10 comprises the inclined surface part 13A having the normal NV4 which passes through the central axis AX, a male screw formed in, for example, a pin, being a pressing member, is screwed into a holder for fixing the cutting insert 10, so that a bottom surface of the pin is capable of pressing the inclined surface part 13A in a direction of the normal NV4. Herein, since the inclined surface part 13A has a convex surface, the pressing member is prevented from coming into nonuniform contact with the inclined surface part 13A, thereby allowing a force to work in the normal NV4 direction.

Further, in the end view, the normal NV4 is directed differently from the respective normals of the peripheral side surface parts 16A-16H, which include the normals NV1, NV2 and NV3. Thus, when the cutting insert 10 is fixed by bringing at least two inner walls of the holder for fixing the cutting insert 10 into contact with at least two peripheral side surface parts out of the peripheral side surface parts 16A-16H, a vertical force can be applied to each peripheral side surface part, whereby the cutting insert 10 can be stably fixed. For instance, when the pressing member, such as a pin, presses the inclined surface part 13A in the normal NV4 direction, the peripheral side surface part 16A can come into contact, as a major restraining surface, with one of the inner wall surfaces of the holder, whereas the peripheral side surface part 16C, which forms a 90-degree angle with respect to the peripheral side surface part 16A, can come into contact, as a minor restraining surface, with one of the inner wall surfaces of the holder. At this time, an angle formed by the normal NV4 and the normal NV3 is greater than the angle α1 formed by the normal NV4 and the normal NV1. Thus, in the end view, i.e., in a projection surface perpendicular to the central axis AX, a component of force in a direction of the normal NV1 of the force working in the normal NV4 direction of the inclined surface part 13A is greater than a component of force in a direction of the normal NV3. Therefore, the cutting insert 10 can be fixed to the holder while the peripheral side surface part 16A and the peripheral side surface part 16C respectively serve as a major restraining surface and a minor restraining surface. At this time, cutting is performed with the cutting edge 18E, as a major cutting edge, formed on the peripheral side surface part 16E side opposite to the peripheral side surface part 16A which is serving as a major restraining surface, or is performed with the cutting edge 18F, as a major cutting edge, which is close to the cutting edge 18E, whereby the cutting insert 10 can be fixed with a greater force in accordance with a direction in which a greater cutting resistance is applied. However, the cutting insert 10 may have a configuration in which the inclined surface part 13A is provided such that the normal NV2 and the normal NV4 match each other in order for the component of force in the normal NV1 direction and the component of force in the normal NV3 direction to be identical to each other, so that the restraining force of the peripheral side surface part 16A and the restraining force of the peripheral side surface part 16C are equal to each other.

Further, since the inclined surface part 13A is inclined with respect to the central axis AX, when the pressing member, such as a pin, presses the inclined surface part 13A in the normal NV4 direction, the first end surface 12 is also pressed in a moving direction of the central axis AX (i.e., a back direction relative to the plane of the page in FIG. 3). Thus, the holder is further provided with a ceiling surface so as to partially cover the first end surface 12, whereby the cutting insert 10 can also be stably fixed in the central axis AX moving direction. At this time, the inclined surface part 13A is separate from the central axis AX, upward in the plane of the page in FIG. 3, and thus, an upper part of the first end surface 12 relative to the plane of the page in the same figure (i.e. an upper part thereof relative to the normal NV3 in the plane of the page) comes into contact with the ceiling surface of the holder, and an upper part of the peripheral edge part 14A of the second end surface 14, relative to the plane of the page, floats so as to be separate from a bottom surface of the holder. Thus, a lower part of the peripheral edge part 14A of the second end surface 14, relative to the plane of the page, can come into contact with the bottom surface of the holder. Therefore, when performing cutting with the cutting edge 18E or the cutting edge 18F serving as a major cutting edge, the lower part of the peripheral edge part 14A, relative to the plane of the page, on which a greater cutting resistance is applied, can be supported by the bottom surface of the holder.

Since the peripheral side surface parts 16A-16H, the inclined surface parts 13A-13H and the cutting edges 18A-18H are respectively formed so as to be in 45-degree rotational symmetry with respect to the central axis AX, when one of the cutting edges 18A-18H has worn, the cutting insert 10 is rotated by 45 degrees, whereby cutting can be performed so as to provide the same effect as in previous cutting with the use of another cutting edge. When such other cutting edge has similarly worn or fractured, the cutting insert 10 is rotated by 45 degrees or by an angle of an integral multiple of 45 degrees with respect to the central axis AX, whereby cutting can be performed using a total of eight cutting edges, i.e., the cutting edges 18A-18H. In this respect, the cutting insert 10 can be rotated around the central axis AX by only slightly separating the pressing member, such as a pin, from any of the inclined surface parts 13A-13H, with which such pressing member has been in contact, and thus, the replacement of a cutting edge used for cutting can be performed without completely separating the cutting insert 10 from the holder. This allows the time for cutting edge replacement to be shortened. The effect is further achieved in a milling cutter which holds a large number of cutting inserts, e.g., five or more cutting inserts.

Figure 4:
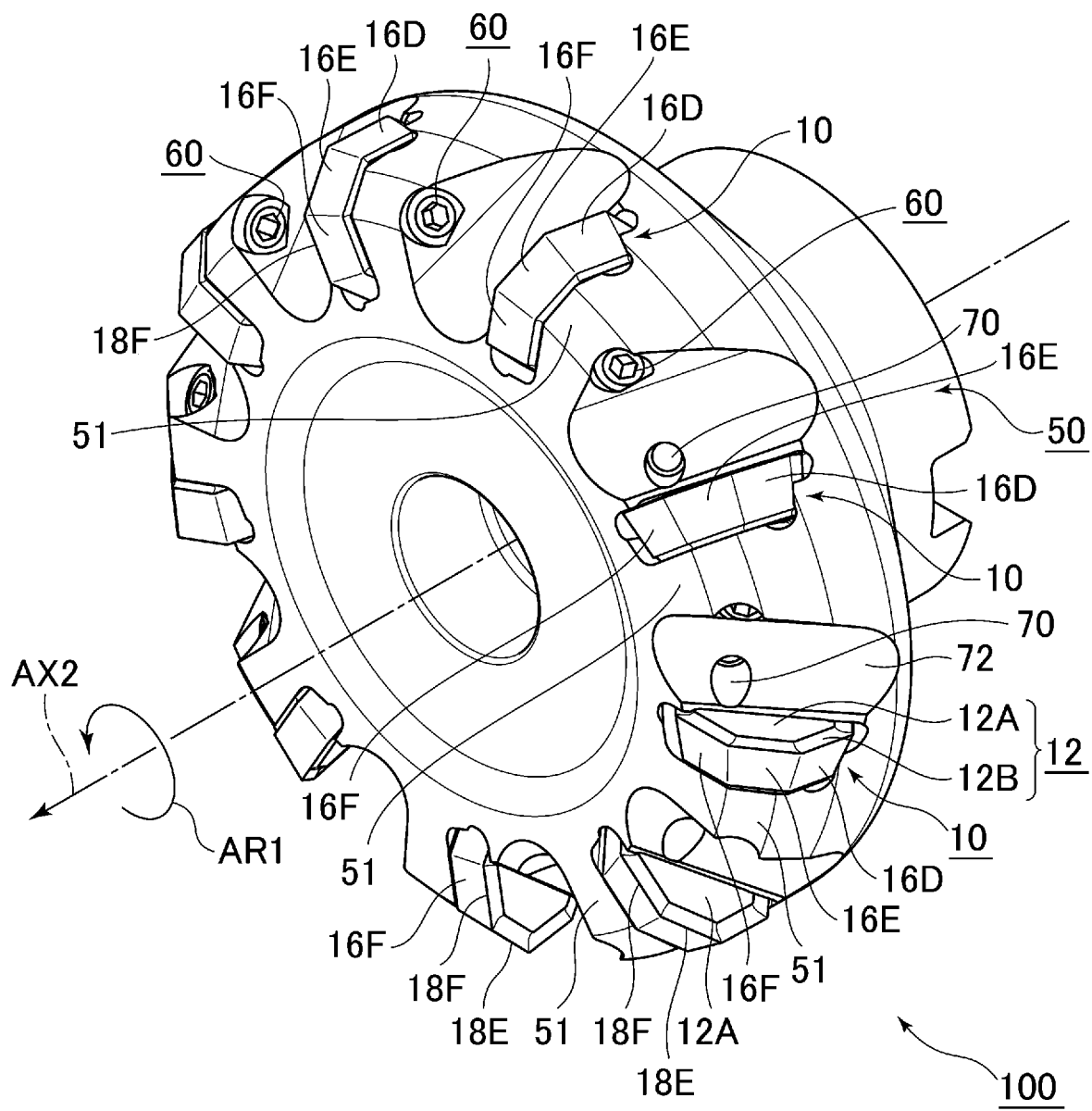
FIG. 4 is a perspective view of a face milling cutter 100.
Figure 5:
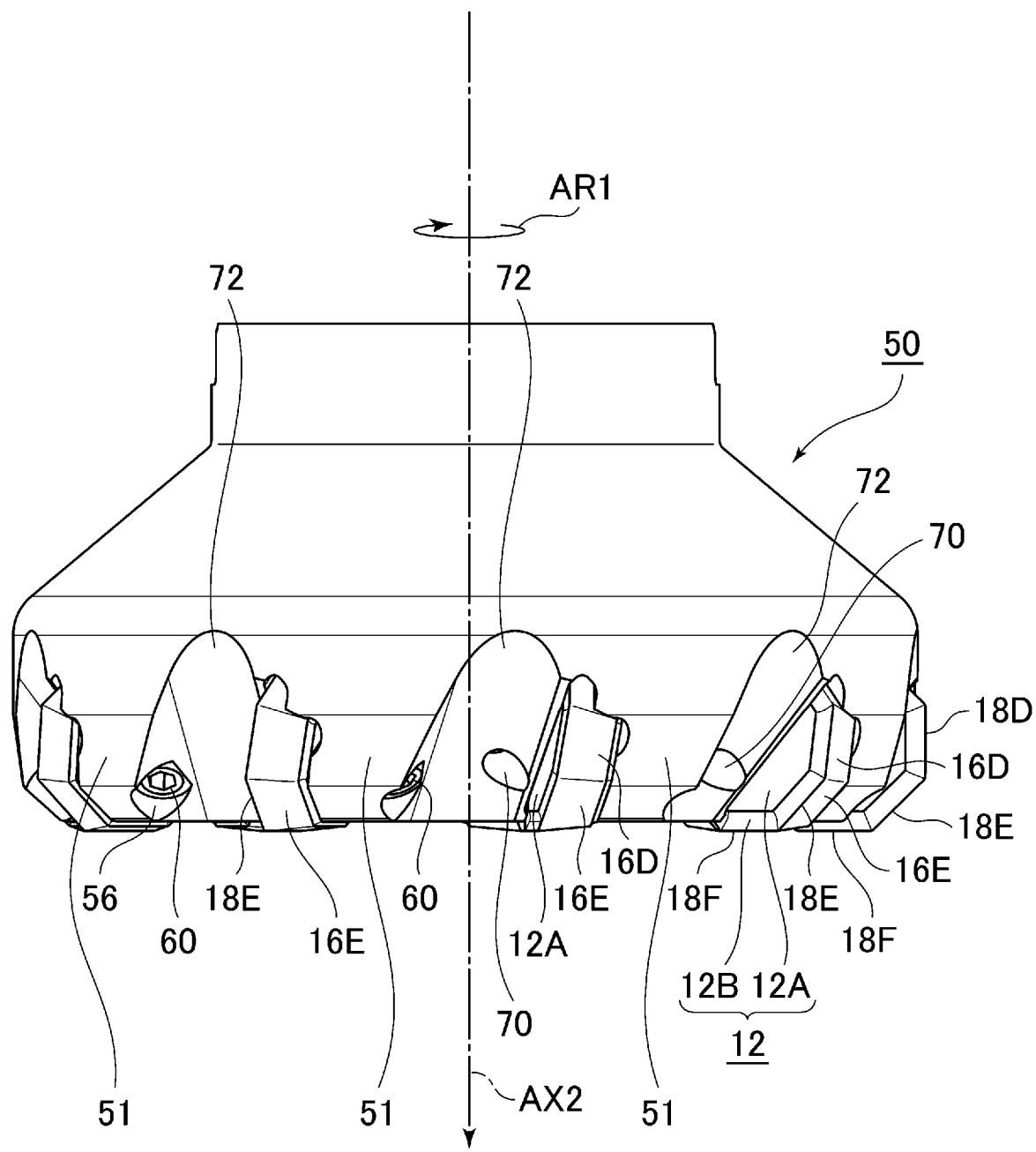
FIG. 5 is a side view of the face milling cutter 100.

Next, a rotating tool in which cutting inserts 10 as described above are mounted on a holder will be described below. FIG. 4 is a perspective view of a face milling cutter 100 in which nine cutting inserts 10 are mounted on a holder 50. FIG. 5 is a side view of the face milling cutter 100. It should be noted that the nine cutting inserts 10 have the same structure. Further, holding parts for respectively holding these cutting inserts 10 have the same structure and are formed so as to be in 40-degree rotational symmetry around a rotational axis AX2 of the holder 50. Therefore, the same or identical elements are denoted by the same symbols, and the description thereof may be simplified here.

As shown in FIGS. 4 and 5, the holder 50 for holding the nine cutting inserts 10 is provided at a leading end of a rotatable tool body of the face milling cutter 100. The holder 50 is rotated around the rotational axis AX2 in a direction of an arrow AR1. Each cutting insert 10 performs cutting while the first end surface 12 and the peripheral side surface 16 respectively serve as a rake surface and a flank. In the present embodiment, cutting is performed while: the cutting edge 18E which is formed in a connecting part between the peripheral side surface part 16E and the peripheral edge part 12B serves as a major cutting edge; the cutting edge 18F which is formed in a connecting part between the peripheral side surface part 16F and the peripheral edge part 12B serves as a minor cutting edge; and the cutting edge connecting the cutting edge 18E and the cutting edge 18F serves as a corner cutting edge.

As shown in these figures, the holder 50 is provided with insert pockets for respectively holding the cutting inserts 10.

When, while the cutting insert 10 is inserted into the insert pocket, a pin 60 presses the inclined surface part 13A from the second end surface 14 side of the cutting insert 10, the cutting insert 10 can be fixed. As shown in FIGS. 4 and 5, the insert pocket is formed so as to cover at least substantially half the region of the first end surface 12 of the cutting insert 10. Further, a base 51 for supporting each cutting insert 10 is formed behind the insert pocket with respect to a direction of rotation, and a space surrounded by a smoothly curved surface 72 formed so as to be recessed inward of the holder 50 is formed forward thereof with respect to the direction of rotation. Through a hole part 70 formed in the curved surface 72, coolant can be supplied toward an exposed part of the first end surface 12. A through hole 58 (FIG. 8), into which the pin 60 is to be inserted, is opened in a surface of the base 51 which faces backward with respect to the direction of rotation.

Figure 6:
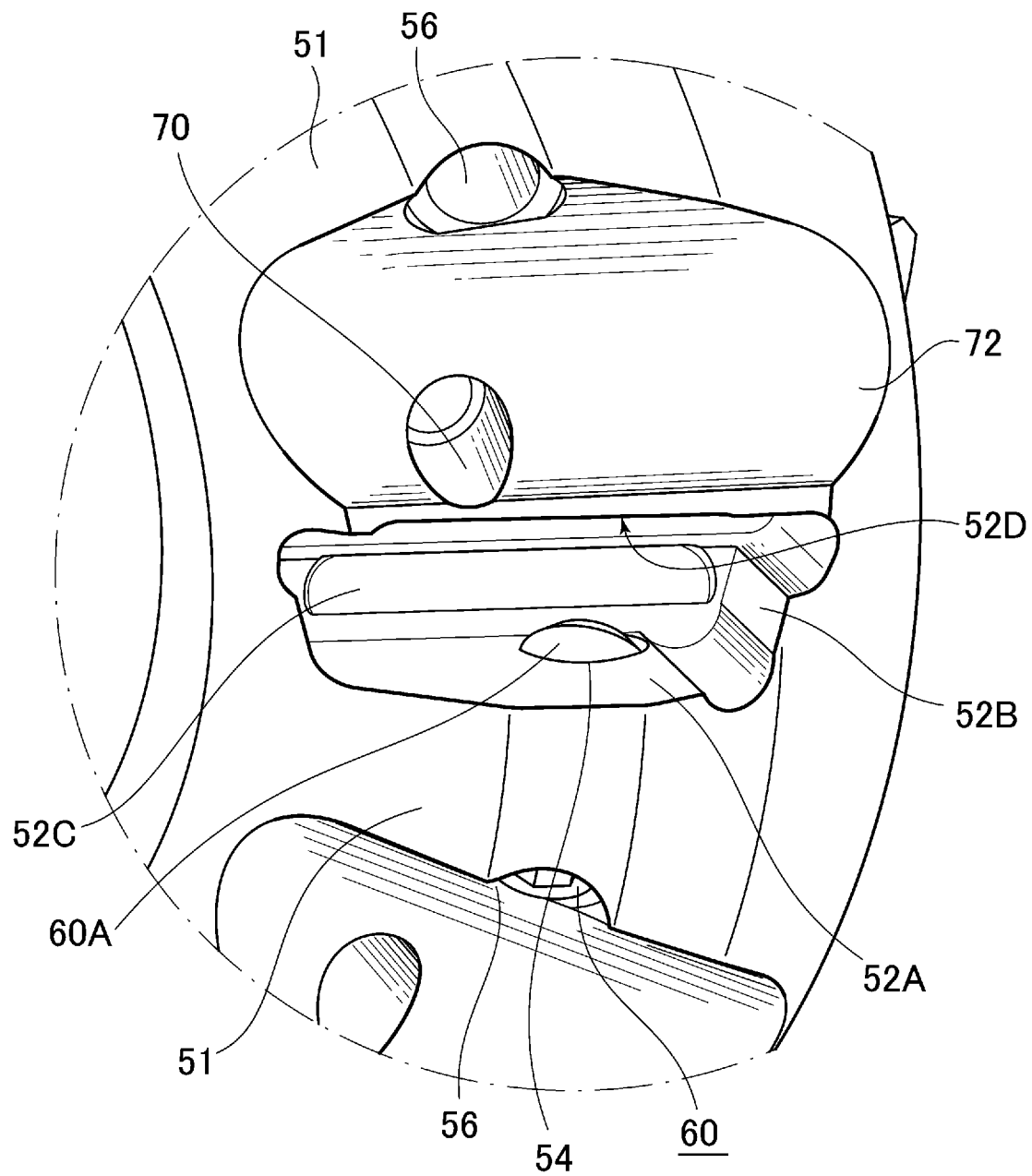
FIG. 6 is a perspective view of insert pockets formed in a holder 50.
Figure 7:
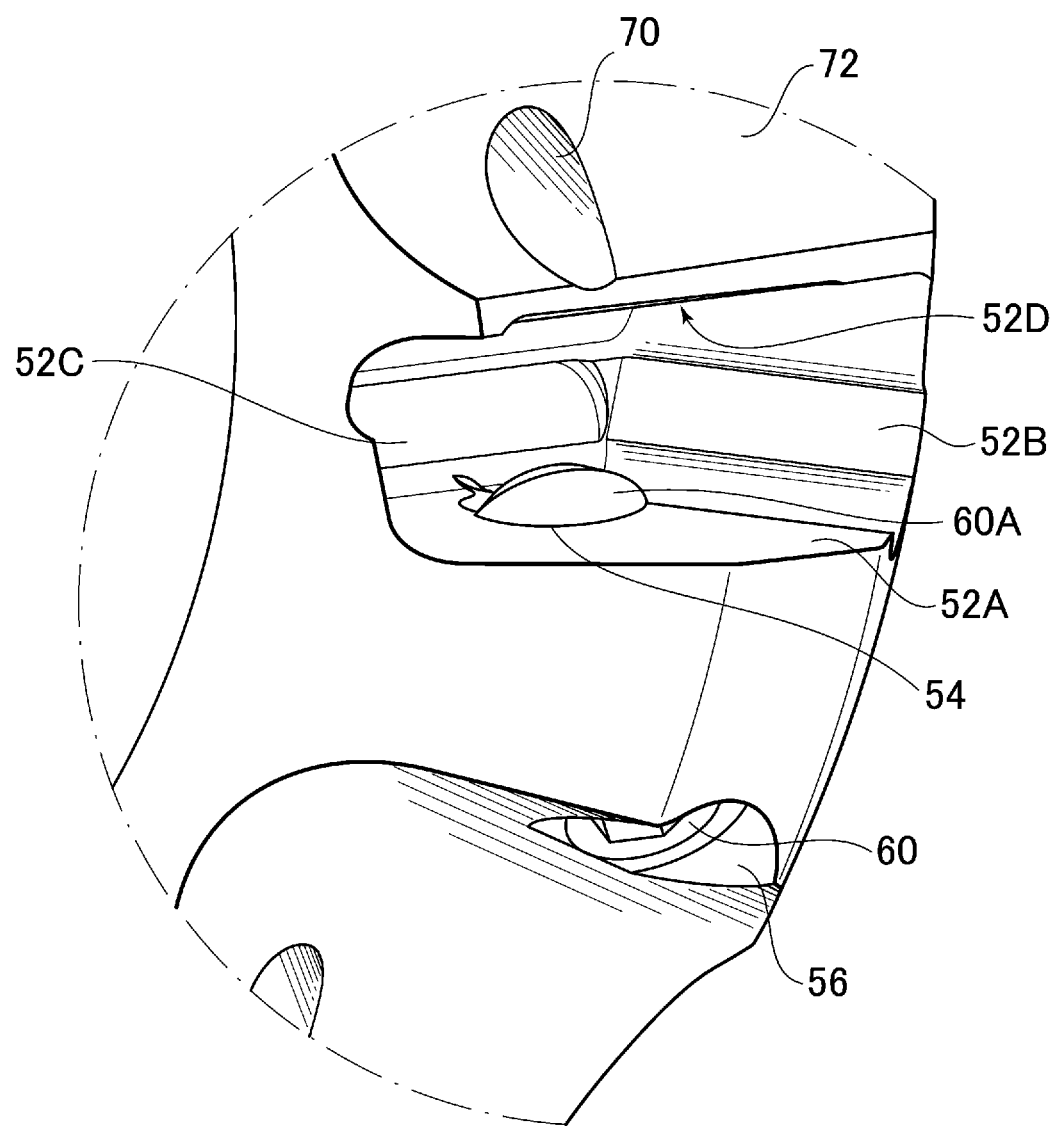
FIG. 7 is a perspective view of insert pockets formed in the holder 50.

A structure for holding cutting inserts 10 will be described below, with reference to the drawings. FIG. 6 is a perspective view of insert pockets before the cutting inserts 10 are mounted. FIG. 7 is a perspective view of the insert pockets seen from a different angle.

As shown in FIG. 6, each insert pocket comprises: an insert seat surface 52A which faces the second end surface 14 when the cutting insert 10 is inserted; an insert wall surface 52B for coming into contact with one of the peripheral side surface parts 16A-16H of the cutting insert 10; an insert wall surface 52C for coming into contact with another one of the peripheral side surface parts 16A-16H; and a ceiling surface 52D which faces the first end surface 12 of the cutting insert 10.

The insert seat surface 52A comprises a flat surface part which faces the second end surface 14 when the cutting insert 10 is inserted into the insert pocket. As described below, in order to fix the cutting insert 10 to the holder 50, the pin 60 pushes the second end surface 14 of the cutting insert 10 up toward the ceiling surface 52D. Thus, the insert seat surface 52A does not come into contact with part of the peripheral edge part 14A which is adjacent to, for example, the inclined surface part 13A, such part being pressed by the pin 60, and instead comes into point- or line-contact with the opposite part of the peripheral edge part 14A which is adjacent to, for example, the inclined surface part 13E.

The insert wall surface 52B comprises a flat surface part which, in order to come into surface-contact with one of the peripheral side surface parts 16A-16H, is inclined, with an obtuse angle of 100 to 120 degrees with respect to the insert seat surface 52A, so as to expand as it heads away from the insert seat surface 52A and toward the ceiling surface 52D in accordance with the shape of any of the peripheral side surface parts 16A-16H. Further, a connecting part between the insert wall surface 52B and the insert seat surface 52A is provided with an undercut that is formed so as to be recessed such that the base 51 is hollowed out, in order to receive a connecting part between the second end surface 14 of the cutting insert 10 and the peripheral side surface 16.

As with the insert wall surface 52B, the insert wall surface 52C comprises a flat surface part which, in order to come into surface-contact with one of the peripheral side surface parts 16A-16H, is inclined with an obtuse angle of 100 to 120 degrees with respect to the insert seat surface 52A. Further, a connecting part between the insert wall surface 52C and the insert seat surface 52A is provided with an undercut that is formed so as to be recessed such that the base 51 is hollowed out, in order to receive the connecting part between the second end surface 14 of the cutting insert 10 and the peripheral side surface 16. The insert wall surface 52B and the insert wall surface 52C are perpendicular to each other in a cross-sectional view of a plane parallel to the flat surface part of the insert seat surface 52A. Thus, when the peripheral side surface part 16A comes into contact with the insert wall surface 52B, it is the peripheral side surface part 16C that comes into contact with the insert wall surface 52C, such peripheral side surface part 16C having an angle of 90 degrees with respect to the peripheral side surface part 16A in the end view of FIG. 2.

The ceiling surface 52D faces the first end surface 12 of the cutting insert 10 and comprises a flat surface part parallel to the flat surface part of the insert seat surface 52A. In order to allow the cutting insert 10 to be mounted, a distance between the flat surface part of the ceiling surface 52D and the flat surface part of the insert seat surface 52A is slightly greater than the thickness of the cutting insert 10, i.e., a distance between the first major surface 12A and the peripheral edge part 14A. As described above, the pin 60 pushes up the second end surface 14 of the cutting insert 10 in order to fix the cutting insert 10 to the holder 50, and accordingly, the first major surface 12A of the first end surface 12 is pushed against the ceiling surface 52D. Thus, the ceiling surface 52D comes into point- or line-contact with part of the first major surface 12A which is around an extension direction of the pin 60. Further, respective connecting parts between the ceiling surface 52D and the insert wall surfaces 52B and 52C are each provided with an undercut that is formed so as to be recessed such that the base 51 is hollowed out, in order to receive the connecting part between the first end surface 12 of the cutting insert 10 and the peripheral side surface 16. This can suppress damage to the cutting edges formed in the connecting part between the first end surface 12 and the peripheral side surface part 16.

The base 51 is provided with the through hole 58 (FIG. 8), which penetrates a surface facing backward with respect to the direction of rotation and the insert seat surface 52A facing forward with respect to the direction of rotation. One of the ends of the through hole 58 is opened in the insert seat surface 52A via an opening 54, whereas the other end thereof is opened in a region surrounded by the curved surface 72 via an opening 56. An inner wall of the through hole 58 is provided with a female thread for screwing with a male screw formed in the pin 60. Further, an axis of the female thread formed in the through hole 58 is provided so as to be parallel to one of the normals of the inclined surface parts 13A-13H that are pressed (e.g., the normal NV4 of the inclined surface part 13A that is pressed). Thus, a bottom surface part 60B of the pin 60 (FIG. 8) is capable of pressing one of the inclined surface parts 13A-13H in the normal direction.

As shown in FIGS. 6 and 7, the ceiling surface 52D corresponds to a surface, facing backward with respect to the direction of rotation, of a wall part that is formed such that a portion thereof which is closer to a leading end thereof has a smaller thickness. The curved surface 72 corresponds to a surface, facing forward with respect to the direction of rotation, of the wall part. The hole part 70 for supplying coolant is formed around a connecting part between the curved surface 72 and the ceiling surface 52D. Further, a surface, facing backward with respect to the direction of rotation, of the base 51 adjacent to the curved surface 72 is provided with the opening 56 for the insertion of the pin 60 which presses an inclined surface part of another, adjacent cutting insert 10 (FIG. 6).

The pin 60 includes: a head part provided with a hexagon socket; a cylindrical, side surface part 60A provided with a male screw; and the bottom surface part 60B for pressing any of the inclined surface parts 13A-13H. As shown in FIG. 7, the head part of the pin 60 has the same diameter as the side surface part 60A provided with the male screw such that, when the cutting insert 10 is pressed, the head part of the pin 60 can be received in the through hole 58 without protruding outward of the curved surface 72.

Figure 8:
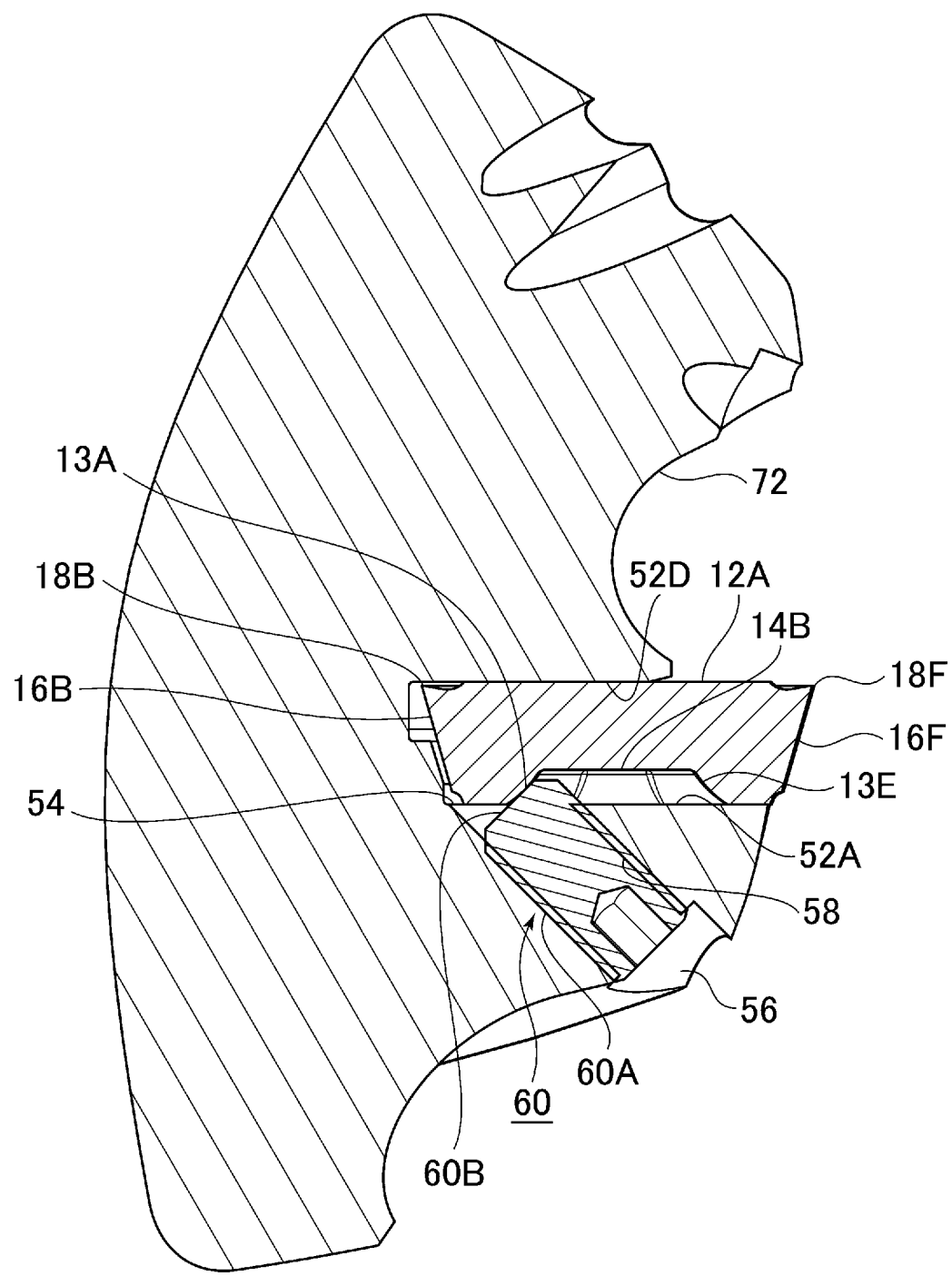
FIG. 8 is a cross-sectional view which passes through a central axis of a pin 60 and a central axis of the cutting insert 10 when the cutting insert 10 is fixed.

FIG. 8 is a cross-sectional view which passes through an axis of the male screw formed in the side surface part 60A of the pin 60 and the central axis AX of the cutting insert 10.

As shown in this figure, the pin 60 presses the inclined surface part 13A at the bottom surface part 60B. Herein, the axis of the male screw formed in the pin 60 passes through the central axis AX of the cutting insert 10. Further, the axis of the male screw formed in the pin 60 is parallel to the normal NV4 of the inclined surface part 13A which passes through the central axis AX. Thus, the bottom surface part 60B, which comprises a flat surface perpendicular to the axis of the male screw formed in the pin 60, is capable of pressing the inclined surface part 13A in the normal NV4 direction.

At this time, the bottom surface part 60B of the pin 60 pushes the inclined surface part 13A up in the ceiling surface 52D direction, and thus, in the peripheral edge part 14A of the second end surface 14, a region thereof adjacent to the inclined surface part 13A, such region corresponding to an radially inward portion thereof close to the rotational axis AX2, slightly floats from the insert seat surface 52A, and instead, in the first major surface 12A of the first end surface 12, a region thereof close to the rotational axis AX2 is pushed against the ceiling surface 52D. Thus, in the peripheral edge part 14A of the second end surface 14, a region thereof adjacent to the inclined surface part 13E, such region corresponding to a radially outward portion thereof far from the rotational axis AX2, comes into contact with the insert seat surface 52A. Further, when the bottom surface part 60B of the pin 60 presses the inclined surface part 13A, the peripheral side surface part 16A comes into contact with the insert wall surface 52C, and the peripheral side surface part 16C comes into contact with the insert wall surface 52B. At this time, in FIG. 3, which corresponds to an end view seen from the central axis AX direction, the angle formed by the normal NV4 and the normal NV1 of the peripheral side surface part 16A is smaller than the angle formed by the normal NV4 and the normal NV3 of the peripheral side surface part 16C. Therefore, when performing cutting using the cutting edge 18F, the cutting edge 18E and the corner cutting edge connecting such cutting edges, the peripheral side surface part 16A, which is required to be restrained with a stronger force, can be pushed against the insert wall surface 52C with a force greater than a force applied to the peripheral side surface part 16C. Accordingly, the cutting insert 10 can be stably fixed to the holder 50. It should be noted that, at this time, the peripheral side surface part 16B does not come into contact with an insert wall surface including the insert wall surfaces 52B and 52C; thus, the cross-sectional view of FIG. 8 shows that a gap is formed between the peripheral side surface part 16B and the insert wall surfaces.

Figure 9:
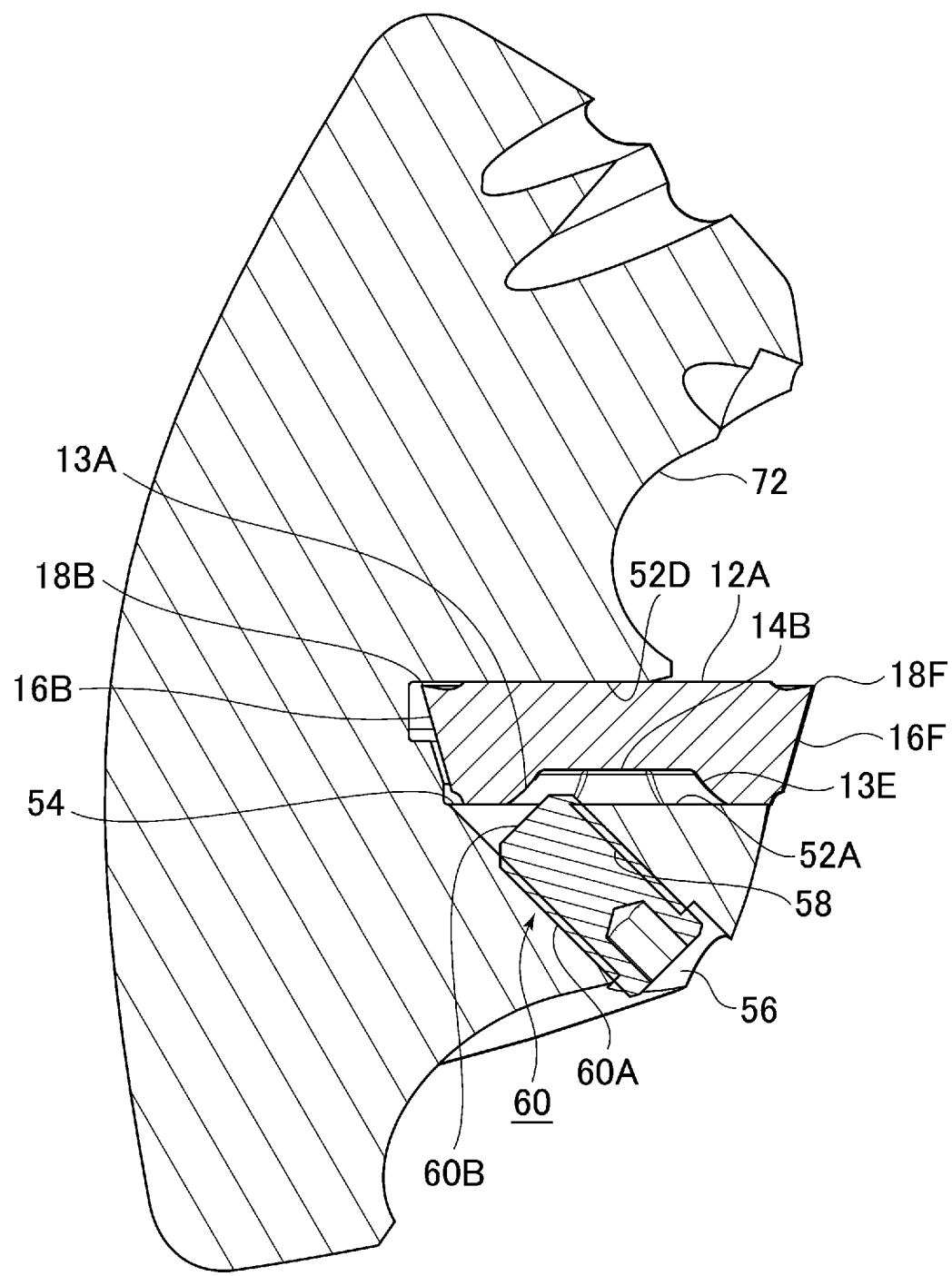
FIG. 9 is a cross-sectional view which passes through the central axis of the pin 60 and the central axis of the cutting insert 10 during cutting edge replacement.

FIG. 9 is a cross-sectional view which passes through the central axis AX of the cutting insert 10 when, in order to replace a cutting edge, the pin 60 is rotated in a direction in which the pin 60 is loosened, so that the bottom surface part 60B of the pin 60 is separated from the inclined surface part 13A. As shown in this figure, the inclined surface parts 13A-13H and the bottom surface part 14B are formed such that, even in the state in which part of the bottom surface part 60B of the pin 60 protrudes from the insert seat surface 52A, the cutting insert 10 and the region covered by the rotation of the protruding region around the central axis AX do not interfere with each other, whereby the cutting insert 10 can be rotated without interfering with the pin 60. Therefore, even if the cutting insert 10 is not completely separated from the holder 50, the cutting edge used in cutting may be replaced through several rotations of the pin 60. Further, it is possible to maintain the state in which part of the bottom surface part 60B of the pin 60 is protruding from the insert seat surface 52A, and thus, even if a cutting edge is replaced while the cutting insert 10 is being suspended, the cutting insert 10 can be prevented from being unfastened and falling from the holder 50. Further, the cutting insert 10 is fixed from the second end surface 14 side, and thus, the hole part 70 for supplying coolant is formed on the opened side, i.e., the first end surface 12 side, and this allows for the cooling of the cutting insert 10 to be facilitated.

As described above, with regard to the cutting insert 10 according to the present embodiment, the pin 60 presses any of the inclined surface parts 13A-13H provided on the second end surface 14 side, whereby two surfaces which form an angle of, for example, 90 degrees, from among the peripheral side surface parts 16A-16H, can respectively be made to come into contact with a radially inward portion of the first end surface 12 and a radially outward portion of the second end surface 14, where the cutting edges are located, and the cutting insert 10 can therefore be stably fixed. Further, even if the cutting insert 10 is not completely separated from the holder 50, the cutting edge used in performing the cutting may be replaced.

It should be noted that the present invention is applicable not only to the face milling cutter 100 but also to cutting tools, including rotating tools and turning tools, such as a milling cutter and an end mill.

An insert wall surface may be formed so as to come into point- or surface-contact with one of the peripheral side surface parts 16A-16H.

Further, various modifications may be made to the angles of the inclined surface parts 13A-13H in accordance with the restraining forces required for the peripheral side surface parts 16A-16H, the first end surface 12 and the second end surface 14. For instance, if one wishes to restrain the first end surface 12 with a strong force, the inclined surface parts 13A-13H may be formed such that each of the inclined surface parts 13A-13H has a small inclination, i.e., such that an angle formed by the normal and the central axis AX is small. However, each of the inclined surface parts 13A-13H needs to be formed so as to have a normal which intersects, above the second end surface 14, with the central axis AX (when only an end of the bottom surface part 60B, rather than a center part thereof, in the pin 60 presses any of the inclined surface parts 13A-13H, the central axis AX and the normal of the inclined surface part may not exactly intersect with each other, and may substantially intersect with each other but be slightly shifted from each other by at most half the diameter of the pin 60).

Furthermore, various modifications may be made to the present invention without departing from the gist of the invention. For example, some components in an embodiment may be incorporated into another embodiment within the extent of the ordinary creativity of a person skilled in the art.

Figure 10:
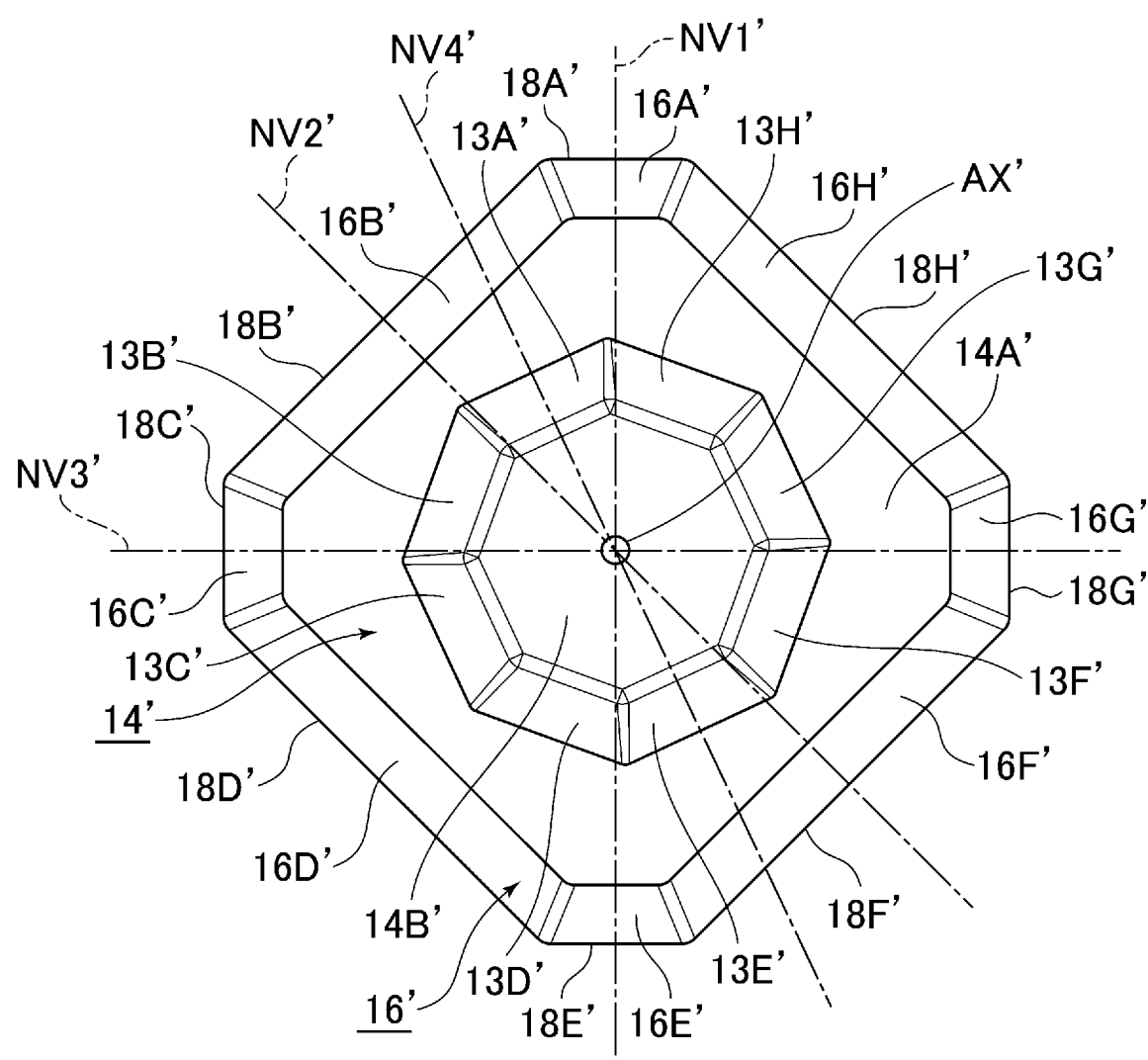
FIG. 10 is an end view of a cutting insert 10'.

For example, FIG. 10 is an end view in which a cutting insert 10', being a variation of the cutting insert 10, is seen from a direction of a central axis AX' (a direction facing a second end surface 14').

A peripheral side surface 16' of the cutting insert 10' includes four peripheral side surface parts 16A', 16C', 16E' and 16G,' which are in 90-degree rotational symmetry with respect to the central axis AX', and also includes four peripheral side surface parts 16B', 16D', 16F' and 16H', which are respectively provided between the peripheral side surface parts 16A', 16C', 16E' and 16G' and are in 90-degree rotational symmetry with respect to the central axis AX'. Further, linear cutting edges 18A'-18H' and corner cutting edges connecting the linear cutting edges 18A'-18H' are respectively formed in respective connecting parts between a first end surface and the peripheral side surface parts 16A'-16H' and curved surfaces connecting the peripheral side surface parts 16A'-16H'.

The second end surface 14', which includes inclined surface parts 13A'-13H', has the same shape as the second end surface 14 of the cutting insert 10 of the first embodiment.

Also in the cutting insert 10' described above, a normal NV4' which passes through the central axis AX' of the inclined surface part 13A' does not match, in the end view, normals NV1', NV2' and NV3', which pass through the central axis AX' of the peripheral side surface parts 16A', 16B' and 16C' and is shifted from such normals NV1', NV2' and NV3' so as to form obtuse angles or acute angles. Thus, when the pin 60 or any other pressing member presses, for example, the inclined surface part 13A' in a direction of the normal NV4', cutting can be performed using the cutting edge 18E' and the cutting edge 18F' and the corner cutting edge connecting such cutting edges in the state in which two peripheral side surface parts (for example, the peripheral side surface part 16B' serving as a major restraining surface and the peripheral side surface part 16H' serving as a minor restraining surface) are pressed against insert wall surfaces. As described above, the number of inclined surface parts which are in rotational symmetry is not necessarily the same as the number of peripheral side surface parts which are in rotational symmetry. However, it is necessary to provide at least as many inclined surface parts as the number of peripheral side surface parts which are in rotational symmetry. It should be noted that the inclined surface part 13A' may be formed such that the normal NV4' and the normal NV1' match each other in the end view, so that the two peripheral side surface parts 16B' and 16H' are respectively restrained by equal forces.

Figure 11:
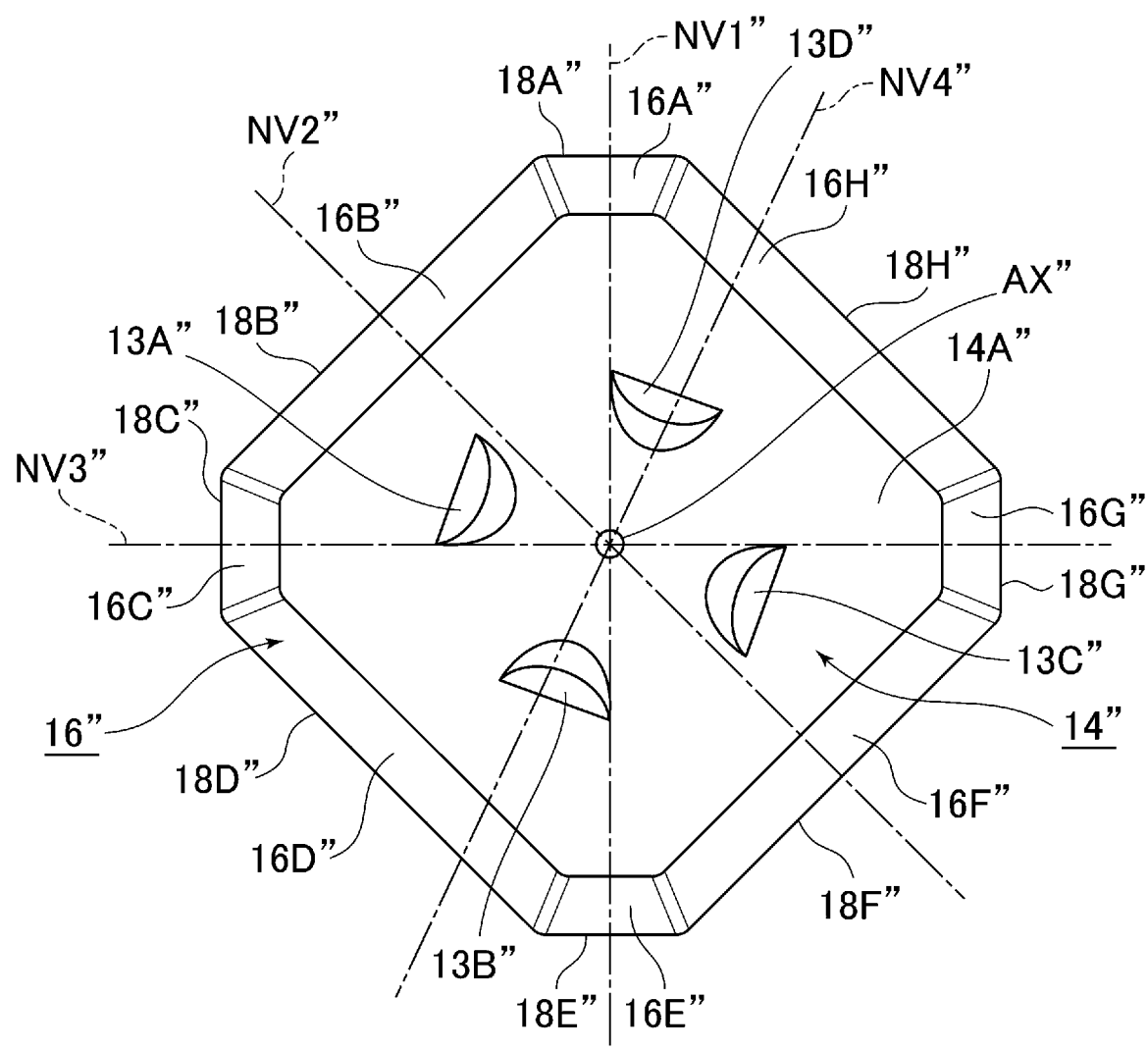
FIG. 11 is an end view of a cutting insert 10".

FIG. 11 is an end view in which a cutting insert 10", being a variation of the cutting insert 10, is seen from a direction of a central axis AX" (a direction facing a second end surface 14").

A peripheral side surface 16" of the cutting insert 10" has the same shape as the peripheral side surface 16' of the cutting insert 10'.

The second end surface 14" is provided with a peripheral edge part 14A" and four inclined surface parts 13A"-13D", which are formed so as to be in 90-degree rotational symmetry with respect to the central axis AX" and to be recessed from the peripheral edge part 14A". Each of the inclined surface parts 13A"-13D" is inclined so as to approach the central axis AX" as it is further dented inward or as it heads away from a connecting part thereof with the peripheral edge part 14A". Further, each of the inclined surface parts 13A"-13D" has a normal which passes through the central axis AX".

As can be seen from the above, when multiple inclined surface parts which are in rotational symmetry with respect to a central axis are each provided, so as to have a normal which passes through the central axis above a second end surface, each of such inclined surface parts can be pressed in the normal direction using a pressing member, such as a pin. Thus, various modifications may be made to part of each inclined surface part which is not pressed. Further, with regard to the shape of each inclined surface part, part thereof which is not pressed can be formed so as not to be in rotational symmetry. However, in order to achieve improved balance, it is preferable to form multiple inclined surface parts so as to be in rotational symmetry.

A center part of the second end surface 14" through which the central axis AX" passes may be formed integrally with the peripheral edge part 14A", and may be formed, for instance, so as to be flush therewith. However, unless the pressing member, such as the pin 60, is retracted so as not to protrude from an insert seat surface corresponding to the insert seat surface 52A, a cutting edge of the cutting insert 10" cannot be replaced. Meanwhile, when the inclined surface parts are formed so as to configure an inner wall of a single recess, the effect of being capable of replacing a cutting insert can be obtained even in the state in which part of the pressing member, such as the pin 60, protrudes from the insert seat surface corresponding to the insert seat surface 52A.

When fixing the cutting insert 10", part of the second end surface 14", instead of the entire second end surface 14", comes into contact with the insert seat surface corresponding to the insert seat surface 52A of the holder 50, and thus, modifications may be freely made to part of the second end surface 14" which does not come into contact with such insert seat surface. For example, the second end surface 14" may, in part or in whole, be formed of a curved surface.

It is sufficient for the moving direction of the pressing member, such as the pin 60, and the normal of each inclined surface part to be parallel to each other, and they are not required to match each other. For instance, if a bottom surface is provided so as to have a predetermined size as with the bottom surface part 60B of the pin 60, the inclined surface part can be pressed in the normal direction using only an end of such bottom surface.

REFERENCE SIGNS LIST

13A-13H: Inclined surface parts; 16A-16H: Peripheral side surface parts; 18A-18H: Cutting edges; 10: Cutting insert; 12: First end surface; 12A: First major surface; 12B: Peripheral edge part; 14: Second end surface; 14: Peripheral edge part; 14A: Peripheral edge part; 14B: Bottom surface part; 50: Holder; 51: Base; 52A: Insert seat surface; 52B: Insert wall surface; 52C: Insert wall surface; 52D: Ceiling surface; 58: Through hole; 60: Pin; 60A: Side surface part; 60B: Bottom surface part; 72: Curved surface; 100: Face milling cutter; AR1: Arrow; AX: Central axis; AX2: Rotational axis; NV1: Normal; NV2: Normal; NV3: Normal; NV4: Normal

What is claimed is:

1. A cutting tool comprising a plurality of cutting inserts and a holder which holds the plurality of cutting inserts, the plurality of cutting inserts comprising:
a first end surface;
a second end surface facing an opposite direction with respect to the first end surface;
a peripheral side surface connecting the first end surface and the second end surface and provided with a plurality of peripheral side surface parts formed in rotational symmetry with respect to a central axis which penetrates the first end surface and the second end surface; and
a plurality of cutting edges respectively formed in connecting parts between the plurality of peripheral side surface parts and the first end surface, wherein:
the second end surface comprises a plurality of inclined surface parts which respectively have a normal intersecting with the central axis and which are formed so as to be in rotational symmetry with respect to the central axis;
the holder comprises a plurality of insert pockets for respectively holding the plurality of cutting inserts;
each of the plurality of insert pockets comprises a first wall part for coming into contact with one of the plurality of peripheral side surface parts of the cutting insert to be held, a second wall part for coming into contact with another one of the plurality of peripheral side surface parts, a ceiling part for coming into contact with the first end surface, and a bottom part for coming into contact with the second end surface;
the holder is provided with a plurality of through holes each of which is provided, so as to be opened in the bottom part, with a female thread for screwing with a male screw formed in a pin for pressing the inclined surface part of the cutting insert held in the insert pocket, said pressing to be made in a direction of the first end surface, wherein the plurality of through holes corresponds to the plurality of insert pockets; and
an axis of the female thread formed in each of the plurality of through holes is parallel to a normal of the inclined surface part which passes through the central axis, the inclined surface part being pressed against a bottom surface of the pin to be screwed into the female thread.

2. The cutting tool according to claim 1, wherein:
the plurality of peripheral side surface parts respectively comprise a surface having a normal passing through the central axis; and
in an end view seen from a direction facing the second end surface, an angle formed between a normal of the plurality of inclined surface parts and the normal of the plurality of peripheral side surface parts respectively is an obtuse angle or an acute angle.

3. The cutting tool according to claim 2, wherein:
the peripheral side surface comprises at least four peripheral side surface parts formed so as to be in rotational symmetry with respect to the central axis and at least four second peripheral side surface parts respectively formed between the peripheral side surface parts which are adjacent to one another;
each of the plurality of second peripheral side surface parts comprises a surface having a normal passing through the central axis; and
in the end view, an angle formed between a normal connecting each of the plurality of inclined surface parts and the central axis and the normal connecting each of the plurality of second peripheral side surface parts and the central axis is an obtuse angle or an acute angle.

4. The cutting tool according to claim 1, wherein:
the plurality of peripheral side surface parts are formed so as to be flat;
the plurality of cutting edges are formed in the connecting parts between the plurality of peripheral side surface parts and the first end surface;
the peripheral side surface comprises a plurality of curved surface parts respectively connected with the plurality of peripheral side surface parts; and
a plurality of corner cutting edges respectively connected with the plurality of cutting edges are provided in connecting parts between the plurality of curved surface parts and the first end surface.

5. The cutting tool according to claim 1, wherein the plurality of inclined surface parts are formed so as to be adjacent to one another so as to surround the central axis.

6. The cutting tool according to claim 1, wherein the second end surface comprises a bottom surface part which the central axis penetrates in a perpendicular manner and which, in an end view, is surrounded by the plurality of inclined surface parts.

7. The cutting tool according to claim 1, wherein the second end surface comprises a peripheral edge part which is connected with the peripheral side surface and which, in an end view, surrounds the plurality of inclined surface parts.

8. The cutting tool according to claim 1, wherein the first end surface forms a regular polygon.

9. The cutting tool according to claim 1, wherein a bottom surface of the pin presses the inclined surface part, whereby part of the first end surface comes into contact with the ceiling part, and part of the second end surface comes into contact with the bottom part in a radially outward portion which is further from a rotational axis than a position where the first end surface and the ceiling part come into contact with each other.

10. A cutting tool comprising a plurality of cutting inserts and a holder which holds the plurality of cutting inserts, the plurality of cutting inserts comprising:
   a first end surface which forms a regular polygonal shape in a plan view;
   a second end surface facing an opposite direction with respect to the first end surface;
   a peripheral side surface connecting the first end surface and the second end surface and provided with a plurality of peripheral side surface parts formed in rotational symmetry with respect to a central axis which penetrates the first end surface and the second end surface; and
   a plurality of cutting edges respectively formed in connecting parts between the plurality of peripheral side surface parts and the first end surface, wherein:
   the second end surface is provided with a recess comprising a plurality of inclined surface parts which respectively have a normal intersecting with the central axis and which are formed in rotational symmetry with respect to the central axis, the inclined surface parts being equal in number to the peripheral side surface parts;
   in an end view seen from a direction facing the second end surface, an angle formed by the normal of each of the inclined surface parts which passes through the central axis and a normal of the peripheral side surface part through which the said normal passes, wherein such normal passes through the central axis, is different from an angle formed by the normal of the said inclined surface part and a normal of the peripheral side surface part adjacent to the said peripheral side surface part, wherein such normal passes through the central axis;
   the holder comprises a plurality of insert pockets for respectively holding the plurality of cutting inserts;
   each of the plurality of insert pockets comprises a first wall part for coming into contact with one of the plurality of peripheral side surface parts of the cutting insert to be held, a second wall part for coming into contact with another one of the plurality of peripheral side surface parts, a ceiling part for coming into contact with the first end surface, and a bottom part for coming into contact with the second end surface;
   the holder is provided with a plurality of through holes each of which is provided, so as to be opened in the bottom part, with a female thread for screwing with a male screw formed in a pin for pressing the inclined surface part of the cutting insert held in the insert pocket, said pressing to be made in a direction of the first end surface, wherein the plurality of through holes corresponds to the plurality of insert pockets; and
   an axis of the female thread formed in each of the plurality of through holes is parallel to a normal of the inclined surface part which passes through the central axis, the inclined surface part being pressed against a bottom surface of the pin to be screwed into the female thread.

* * * * *